(12) United States Patent
Tang et al.

(10) Patent No.: US 10,601,930 B2
(45) Date of Patent: Mar. 24, 2020

(54) LEASE-BASED HEARTBEAT PROTOCOL METHOD AND APPARATUS

(71) Applicant: Alibaba Group Holding Limited, George Town, Grand Cayman (KY)

(72) Inventors: Zhiyang Tang, Hangzhou (CN); Yijun Lu, Hangzhou (CN); Yunfeng Tao, Hangzhou (CN); Yunfeng Zhu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 274 days.

(21) Appl. No.: 15/442,464

(22) Filed: Feb. 24, 2017

(65) Prior Publication Data

US 2017/0251063 A1 Aug. 31, 2017

(30) Foreign Application Priority Data

Feb. 25, 2016 (CN) .......................... 2016 1 0105054

(51) Int. Cl.
*H04L 29/08* (2006.01)
*H04L 12/58* (2006.01)
(Continued)

(52) U.S. Cl.
CPC ............ *H04L 67/145* (2013.01); *H04L 43/10* (2013.01); *H04L 43/103* (2013.01); *H04L 51/30* (2013.01); *H04L 67/42* (2013.01)

(58) Field of Classification Search
CPC ....... H04L 67/145; H04L 51/30; H04L 67/42; H04L 43/10; H04L 43/103
See application file for complete search history.

(56) References Cited

U.S. PATENT DOCUMENTS

2004/0220913 A1  11/2004  Walker
2006/0075061 A1   4/2006  Garcia
(Continued)

FOREIGN PATENT DOCUMENTS

CN    103442353 A    12/2013
CN    103716323 A     4/2014
(Continued)

OTHER PUBLICATIONS

First Search Report issued in corresponding International Application No. 201610105054.3 (1 pg.).
(Continued)

*Primary Examiner* — Caroline H Jahnige
(74) *Attorney, Agent, or Firm* — Finnegan Henderson Farabow Garrett & Dunner LLP

(57) ABSTRACT

A lease-based heartbeat protocol method is provided. The method may include sending a heartbeat request to a server device in a lease period, and receiving a heartbeat request response from the server device; and determining a retry sending at adaptive interval in response to the heartbeat request response being abnormal, and sending a retry heartbeat request to the server device again after the retry sending interval is past, until the lease period expires or a corresponding heartbeat request response is normal. As such, two successive retry heartbeat requests can be sent at a relatively large time interval at an initial stage of heartbeat request retry. At a later stage of the heartbeat request retry, the time interval associated with the retry heartbeat requests is reduced, such that re-sent heartbeat requests can be sent at a higher speed.

17 Claims, 5 Drawing Sheets

(51) Int. Cl.
*H04L 12/26* (2006.01)
*H04L 29/06* (2006.01)

(56) References Cited

U.S. PATENT DOCUMENTS

| | | |
|---|---|---|
| 2006/0107284 A1 | 5/2006 | Crawford et al. |
| 2006/0271681 A1* | 11/2006 | Apreutesei ............. H04L 67/24 709/226 |
| 2007/0214256 A1 | 9/2007 | Castaneda et al. |
| 2009/0276491 A1 | 11/2009 | Lin et al. |
| 2014/0025820 A1 | 1/2014 | Rawat et al. |
| 2014/0068038 A1* | 3/2014 | Brook ................... H04W 76/25 709/223 |
| 2014/0128051 A1 | 5/2014 | Choi et al. |
| 2014/0344379 A1 | 11/2014 | Chakraborti et al. |
| 2015/0363124 A1* | 12/2015 | Rath ................... G06F 11/2097 709/219 |

FOREIGN PATENT DOCUMENTS

| | | |
|---|---|---|
| EP | 2725740 A1 | 4/2014 |
| WO | WO 2017/147517 A1 | 8/2017 |

OTHER PUBLICATIONS

First Office Action issued by the State Intellectual Property Office of People's Republic of China in corresponding Chinese Application No. 201610105054.3, dated Aug. 22, 2019 (13 pgs.).
The Extended Search Report pursuant to Rule 62 EPC, the Supplementary European Search Report (Art. 153(7) EPC) and the European Search Opinion issued in corresponding European Application No. 17757371.4-1213/ 3420463, dated Aug. 16, 2019 (7 pgs.).
PCT International Preliminary Report on Patentability, International Written Opinion and International Search Report issued in corresponding PCT Application No. PCT/CN2017/019493; dated May 15, 2017 (9 pgs.).

\* cited by examiner

LEASE-BASED HEARTBEAT PROTOCOL METHOD AND APPARATUS

CROSS REFERENCE TO RELATED PATENT APPLICATION

This application claims foreign priority to Chinese Patent Application No. 201610105054.3 filed on Feb. 25, 2016, entitled "Lease-Based Heartbeat Protocol Method and Apparatus", which is hereby incorporated by reference in its entirety.

TECHNICAL FIELD

The present disclosure relates to the field of computers, and in particular, to lease-based heartbeat protocol technologies.

BACKGROUND

In a distributed lock service system, a coarse-grained mutex mechanism can ensure that only one client terminal can occupy a lock at one time. An implementation of a lock relies on a lease-based session maintaining mechanism, and this session maintaining mechanism ensures that the client terminal detects a timeout at a time earlier than a server terminal detects the timeout upon the timeout of a session. Generally, after detecting a timeout, a client terminal may notify an application layer that a distributed lock is lost, and a server terminal may release this original lock after detecting the timeout, so that other client terminals may contend for the lock.

The foregoing maintenance of a session mainly relies on heartbeat(s) between a client terminal and a server terminal. When a heartbeat protocol is designed, a primary objective is to ensure that a session timeout of the client terminal occurs prior to that of the server terminal in situations where a quick and automatic recovery cannot be realized, e.g., network isolation or server shutdown. In this way, the correctness of a lock service can be ensured. Second, in situations where a system can be automatically recovered quickly, such as network jitter or failover, a client terminal may attempt to report lock loss events to an application program as few as possible, which can ensure the stability of the system.

In existing technologies, a reliability coordination system (such as Zookeeper) in a distributed system adopts a design for heartbeats in which sending and receiving thereof are independent of each other. After a session between a server terminal (i.e., Server or server device) and a client terminal (i.e., Client or client device) is established, the client terminal sends heartbeat requests to the server terminal at fixed sending intervals ($\frac{1}{3}$ of a session lease period by default). Sending of a current heartbeat request is only driven by time intervals, and does not depend upon whether a response to a previous heartbeat has arrived. After receiving the heartbeat request, the server terminal updates the lease period of the current session to a future moment corresponding to 1 time of a session lease period as long as the current session has not expired, and immediately returns a heartbeat request response. Each time when the client terminal receives a heartbeat request response from the server terminal, the current lease of the client terminal is extended forward to a future moment corresponding to $\frac{2}{3}$ of the session lease period. If the lease of the client terminal expires, the client terminal (Client) of the reliability coordination system (ZooKeeper) in the distributed system will directly send an event, which is referred to as a session event, to an application layer, to inform an application program that the session has expired. In a heartbeat protocol of the reliability coordination system (ZooKeeper) in the distributed system, if a temporary network isolation occurs since the last time when the client terminal (Client) successfully received a heartbeat request response, the client terminal (Client) has a buffer time of $\frac{2}{3}$ of the session lease period to complete a retry for a heartbeat request. However, the client terminal (Client) of the reliability coordination system (ZooKeeper) in the distributed system simply performs repeating heartbeat requests with a fixed sending interval. Since the client terminal (Client) lacks a reasonable retry logic to cope with various unexpected communication exceptions, the unreasonable retry logic for sending heartbeat requests causes a huge impact and pressure on network nodes and the server terminal (Server). From the perspective of an average number of retry heartbeat requests that are sent, at most two retry heartbeat requests can be initiated within the buffer time of $\frac{2}{3}$ of the session lease period, causing the retry logic of the client terminal (Client) to be over-simplified within the buffer time for sending the retry heartbeat requests. As a result, the application program may lose the lock due to a temporary network exception, thus increasing the sensitivity of the client terminal (Client) with respect to network failures.

In existing technologies, the use of a heartbeat protocol of a reliability coordination system (such as ZooKeeper) in a distributed system to maintain a session between a server terminal and a client terminal causes an unreasonable retry logic for sending heartbeat requests and a huge impact and pressure on network nodes and the server terminal (Server). Moreover, the retry logic is overly simple, and as a result, an application program may lose a lock due to a temporary network exception, increasing the sensitivity of the client terminal (Client) with respect to network failures.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of the present disclosure is to provide a lease-based heartbeat protocol method and an apparatus thereof, to decrease the sensitivity of a client device with respect to network failures by solving the problems in the existing technologies. In the existing technologies, the use of a heartbeat protocol of a reliability coordination system in a distributed system to maintain a session between a server terminal and a client terminal has caused an unreasonable retry logic for sending heartbeat requests, which leads to a huge impact and pressure on network nodes and the server terminal (Server), and the loss of a lock by an application program due to a temporary network exception.

According to an aspect of the present disclosure, a lease-based heartbeat protocol method is provided, which may include sending a heartbeat request to a server device in a lease period, and receiving a heartbeat request response from the server device; and determining a retry sending interval based on a reverse exponential backoff algorithm in response to the heartbeat request response being abnormal, and sending a retry heartbeat request to the server device again after the retry sending interval, until the lease period expires or the corresponding heartbeat request response is normal.

Furthermore, according to another aspect of the present disclosure, a lease-based heartbeat protocol method is provided, which may include determining a backoff sending interval based on an anomaly determining time point of a heartbeat request response and a lease expiration time point using a reverse exponential backoff algorithm in response to the heartbeat request response being abnormal; obtaining a random time interval correction based on a random-time function and the backoff sending interval; and determining a retry sending interval based on the random time interval correction and the backoff sending interval.

According to another aspect of the present disclosure, a lease-based heartbeat protocol device is further provided, which may include a sending and receiving unit to send a heartbeat request to a server device in a lease period, and receive a heartbeat request response from the server device; and a retry unit to determine a retry sending interval based on a reverse exponential backoff algorithm in response to the heartbeat request response being abnormal, and send a retry heartbeat request to the server device again after the retry sending interval, until the lease period expires or the corresponding heartbeat request response is normal.

In implementations, in response to the heartbeat request response being abnormal, the retry unit may further determine a backoff sending interval based on an anomaly determining time point of the heartbeat request response and a lease expiration time point using a reverse exponential backoff algorithm; obtain a random time interval correction based on a random-time function and the backoff sending interval; and determine the retry sending interval based on the random time interval correction and the backoff sending interval.

Compared with the existing technologies, the disclosed lease-based heartbeat protocol method and apparatus send a heartbeat request to a server device in a lease period, and receive a heartbeat request response from the server device, determine a retry sending interval based on a reverse exponential backoff algorithm when the heartbeat request response is abnormal, and send a retry heartbeat request to the server device again after the retry sending interval, till the lease period expires or the corresponding heartbeat request response is normal. When the heartbeat request response is abnormal, the retry sending interval is determined based on the reverse exponential backoff algorithm, and the retry heartbeat request is sent to the server device again after the retry sending interval. As such, at an initial stage of heartbeat request retries, two successive retry heartbeat requests can be sent at a relatively large sending interval, thereby reducing impact and pressure of the heartbeat requests on network nodes and the server device. At a later stage of the heartbeat request retries, the sending interval of the heartbeat request retries is reduced, such that re-sent heartbeat requests can be sent at a higher frequency, thereby effectively improving the success rate of recovering from a network failure while ensuring network stability and reducing network pressure.

Furthermore, when a heartbeat request response is abnormal, the disclosed lease-based heartbeat protocol method and apparatus may determine a backoff sending interval based on an anomaly determining time point of the heartbeat request response and a lease expiration time point using a reverse exponential backoff algorithm, obtain a random time interval correction based on a random-time function and the backoff sending interval, and determine the retry sending interval based on the random time interval correction and the backoff sending interval. When a network failure occurs at the server device, the random time interval correction for the backoff sending interval for sending heartbeat requests is obtained based on the random-time function, and the retry sending interval is determined based on the random correction of the interval and the backoff sending interval. Therefore, a resonance effect caused by heartbeat requests simultaneously sent by multiple client devices to the server device is avoided to a certain extent, thus effectively protecting the network nodes and the server device.

BRIEF DESCRIPTION OF THE DRAWINGS

Other features, objectives and advantages of the present disclosure will become more apparent upon reading the detailed description of non-limiting embodiments with reference to the following accompanying drawings.

Identical or similar reference labels in the accompanying drawings represent identical or similar components.

DETAILED DESCRIPTION

The present disclosure is further described in detail herein with reference to the accompanying drawings.

Figure 1:
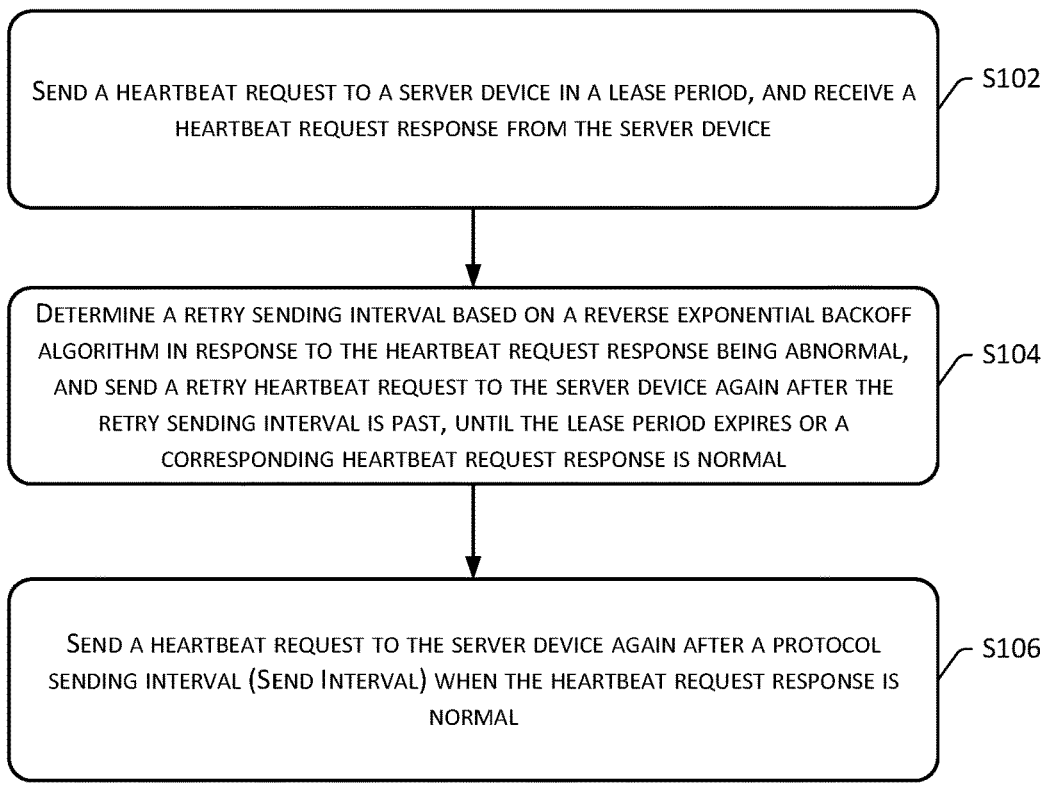
FIG. 1 is a flowchart of a lease-based heartbeat protocol method according to an aspect of the present disclosure.

FIG. 1 is a flowchart of a lease-based heartbeat protocol method 100 according to an aspect of the present disclosure. In embodiments, the method 100 may include S102 and S104.

S102 sends a heartbeat request to a server device in a lease period, and receives a heartbeat request response from the server device. S104 determines a retry sending interval based on a reverse exponential backoff algorithm in response to the heartbeat request response being abnormal, and sends a retry heartbeat request to the server device again after the retry sending interval is past, until the lease period expires or a corresponding heartbeat request response is normal.

It should be noted that heart-beating between a client device and a server device in the embodiments of the present disclosure is a periodic process. In a normal situation, a heartbeat period may be divided into three stages. The first stage corresponds to a period from sending of a heartbeat request by the client device to receiving of the heartbeat request by the server device. The second stage corresponds to a period from sending of a heartbeat request response by the server device to receiving of the heartbeat request response by the client device. The third stage corresponds to a period in which the client device waits for a protocol sending interval (Send Interval). These three stages form one heartbeat period that cycles continuously between the client device and server device. In an abnormal situation, the first stage and the second stage may not be successfully completed in one try, and therefore, heartbeat request(s) need(s) to be retried in the lease period. The heartbeat request(s) may be retried multiple times, and the client device may wait for a retry sending interval before each retry. However, the retries of the heartbeat request(s) are not performed for an infinite number of times, and are dependent on the lease period of the client device.

Figure 2:
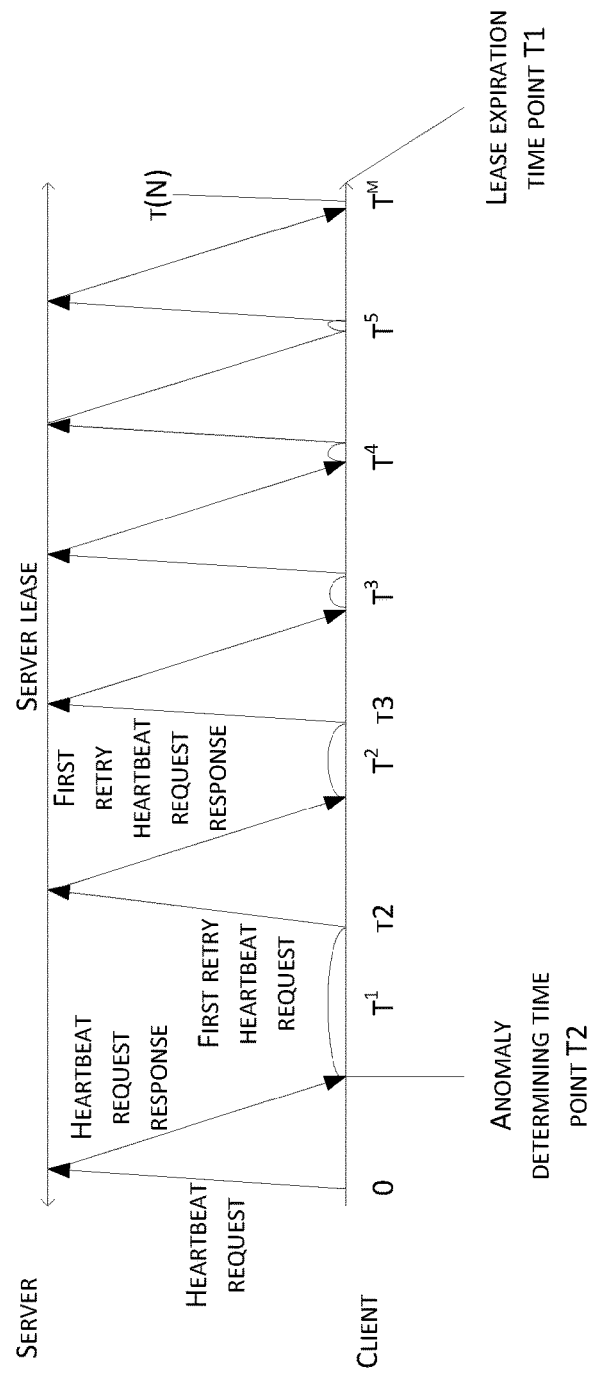
FIG. 2 is a flowchart illustrating distribution of retry sending intervals in a lease-based heartbeat protocol method according to an aspect of the present disclosure.

FIG. 2 is a flowchart 200 illustrating distribution of retry sending intervals in a lease-based heartbeat protocol method according to an aspect of the present disclosure. As shown in FIG. 2, a client device (client) sends a heartbeat request to a server device (server), and receives a heartbeat request response from the server device at S102. At S104, a first heartbeat request response is abnormal and a first retry heartbeat request needs to be sent to the server device. If a first retry sending interval is $T^1$ as shown in FIG. 2, a reverse exponential backoff algorithm is performed on the first retry sending interval $T^1$ if the retry heartbeat request needs to be sent again subsequently. Upon determining that the first retry heartbeat request response is abnormal as shown in FIG. 2, a second retry heartbeat request needs to be sent again after the second retry sending interval $T^2$. If subsequent retry heartbeat request responses are abnormal, corresponding retry sending intervals obtained based on the reverse exponential backoff algorithm are $T^3$, $T^4$, $T^5$ ... $T^m$ respectively, wherein m is the number of times that the retry heartbeat request needs to be sent after a current retry sending interval. The retry heartbeat request is sent to the server device again after the retry sending interval, until the lease period expires or a corresponding heartbeat request response is normal.

Furthermore, S104 determines a retry sending interval based on a reverse exponential backoff algorithm in response to the heartbeat request response being abnormal, and sends a retry heartbeat request to the server device again after the retry sending interval, until the lease period expires or a corresponding heartbeat request response is normal. Specifically, S104 determines the retry sending interval based on an anomaly determining time point of the heartbeat request response and a lease expiration time point using the reverse exponential backoff algorithm when the heartbeat request response is abnormal.

In implementations, determining the retry sending interval T based on the anomaly determining time point of the heartbeat request response and the lease expiration time point at S104 may include: $T=(T1-T2)/(K^N)$, wherein T1 is the lease expiration time point, T2 is the anomaly determining time point, K is greater than 1, and N is a current number of retries of sending the heartbeat request.

In implementations, the lease expiration time point T1 at S104 may be either a lease of the server device or a lease of the client device, because the lease of the client device is determined by subtracting the anomaly determining time point of the heartbeat request response from the lease of the server device. A value of K, which is used for indicating a reverse backoff degree of the reverse exponential backoff algorithm, is greater than 1. In implementations, K may be equal to 2. Apparently, one skilled in the art can understand that the value of K at S104 is merely an example, and other existing or future possible specific values of K, if applicable to the present disclosure, should also be included in the scope of protection of the present disclosure, and are incorporated herein by reference.

In implementations, the heartbeat request is sent to the server device at a time moment 0, and the lease expiration time point is T1. When the heartbeat request response from the server device is abnormal (with the anomaly determining time point of the heartbeat request response being T2 as shown in FIG. 2), a first retry heartbeat request is sent to the server device after waiting for a first retry sending interval: $T^1=(T1-T2)/(2^1)$ since the anomaly determining time point T2 after the anomaly of the heartbeat request response. If the first retry heartbeat request response is also abnormal (with an anomaly determining time point of the first retry heartbeat request response being t2 as shown in FIG. 2), a second retry heartbeat request is sent to the server device after waiting for a second retry sending interval: $T^2=(T1-T2)/(2^2)$ since the anomaly determining time point t2 after the anomaly of the first retry heartbeat request response. If the second retry heartbeat request response is still abnormal (with an anomaly determining time point of the second retry heartbeat request response being t3 as shown in FIG. 2), a third retry heartbeat request is sent to the server device after waiting for a third retry sending interval: $T^3=(T1-T2)/(2^3)$ since the anomaly determining time point t3 after the anomaly of the second retry heartbeat request response. This pattern repeats accordingly. If an $(N-1)^{th}$ retry heartbeat request response is abnormal at an anomaly determining time point $t(N-1)$ of the $(N-1)^{th}$ retry heartbeat request response, an $N^{th}$ retry heartbeat request is sent to the server device after waiting for an $N^{th}$ retry sending interval: $TN=(T1-T2)/(2^N)$ obtained through the reverse exponential backoff algorithm, until the lease period expires or a corresponding heartbeat request response is normal.

For example, the heartbeat request is sent to the server device at a time moment 0 and the lease expiration time point T1 is 00:00:52. When the heartbeat request response from the server device is abnormal, with the anomaly determining time point T2 of the heartbeat request response as 00:00:22, a first retry heartbeat request is sent to the server device at a time point 00:00:37 after waiting for a first retry sending interval, which is $T^1=(T1-T2)/(2^1)=15$ seconds, since the anomaly determining time point T2 (which is 00:00:22). If the first retry heartbeat request response from the server device is also abnormal and an anomaly determining time point t2 of the first retry heartbeat request response is 00:00:37.200, a second retry heartbeat request is sent to the server device at the time point 00:00:44.900 after waiting for the second retry sending interval, which is $T^2=(T1-T2)/(2^2)=7.5$ seconds (i.e., 7 seconds and 500 milliseconds) since the anomaly determining time point t2 (which is 00:00:37.400). If the second retry heartbeat request response from the server device is also abnormal and an anomaly determining time point t3 of the second retry heartbeat request response is 00:00:45.100, a third retry heartbeat request is sent to the server device at the time point 00:00:48.850 after waiting for the third retry sending interval, which is $T^3=(T1-T2)/(2^3)=3.75$ seconds (i.e., 3 seconds and 750 milliseconds) since the anomaly determining time point t3 (which is 00:00:45.100), and so forth. If a retry heartbeat request response received from the server device is normal at a certain time point 00:00:32 before the lease expiration time point T1 (which is 00:00:52), this indicates that a heartbeat between the server device and the client device is successfully established in the current lease period. If an $N^{th}$ retry heartbeat request response is still abnormal, and a remaining time between the anomaly determining time point $t(N)$ of the $N^{th}$ retry heartbeat request response and the lease expiration time point T1 (which is 00:00:52) is 150 ms (the remaining time between $t(N)$ and T1 is merely an example here), heart-beating between the server device and the client device is considered to be disrupted at the anomaly determining time point $t(N)$ of the $N^{th}$ retry heartbeat request response because no heartbeat request response from the server device can be received within the 150 ms.

Furthermore, in implementations, determining the anomaly determining time point at S104 may include determining that the heartbeat request response is abnormal when the heartbeat request response is received and the heartbeat request response includes content indicating that the heartbeat request is an illegitimate request or the heartbeat request response is an error response to the heartbeat request, and determining a receiving time of the heartbeat request response as the anomaly determining time point. In implementations, determining the anomaly determining time point at S104 may include determining that the heartbeat request response is abnormal when the heartbeat request response is not received before a timeout, and determining a time point of the timeout as the anomaly determining time point.

Figure 3:
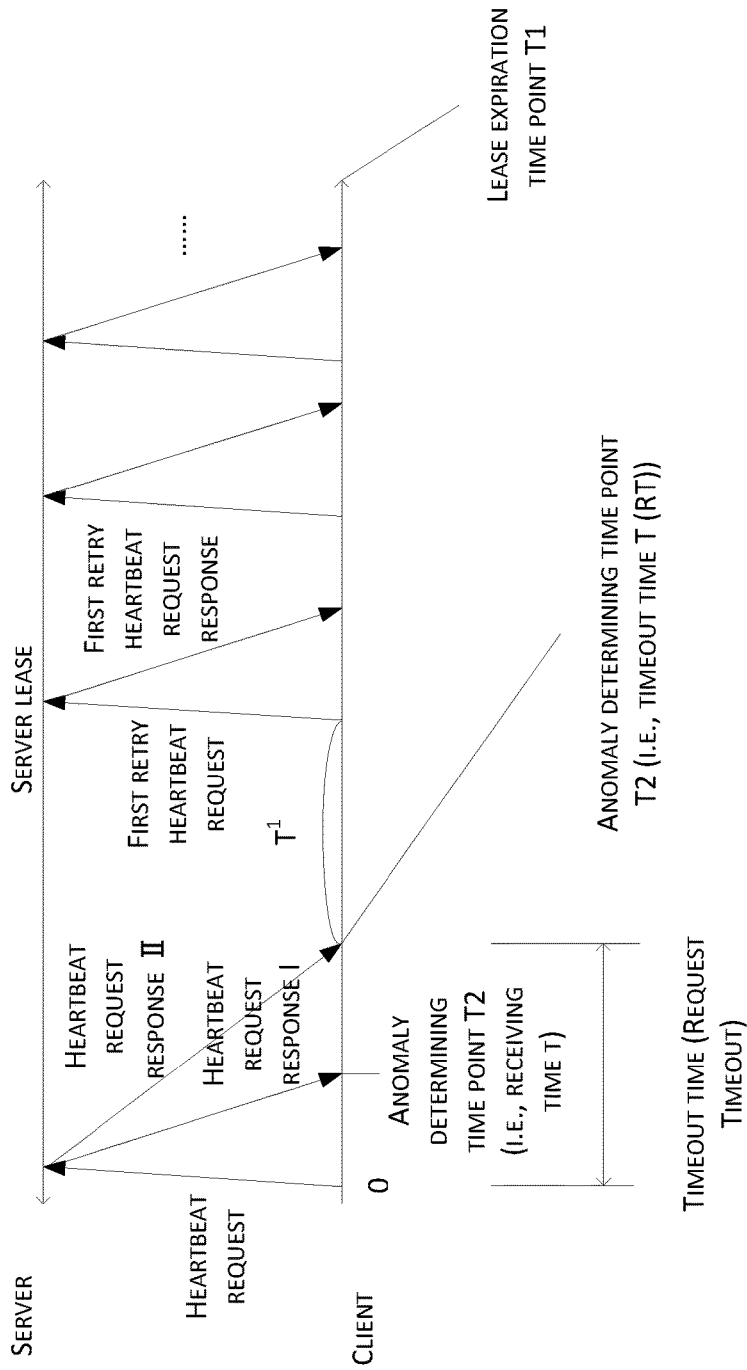
FIG. 3 is a flowchart of determining an anomaly determining time point according to an aspect of the present disclosure.

For example, FIG. 3 shows a flowchart 300 of determining an anomaly determining time point according to an aspect of the present disclosure. As shown in FIG. 3, if a client device (client) receives a heartbeat request response I from a server device (server) after sending a heartbeat request to the server device, the heartbeat request response I is determined as abnormal when content of the heartbeat request corresponding to the heartbeat request response I is illegitimate request content or the heartbeat request response I is an error response to the heartbeat request, and a receiving time t of the heartbeat request response I is determined as the anomaly determining time point T2. If the heartbeat request response from the server device is not received before a timeout (Request Timeout) (e.g., a receiving time of the heartbeat request response II exceeds the timeout), the heartbeat request response II is determined as abnormal, and a time point of the timeout, t(RT), is determined as the anomaly determining time point T2.

In implementations, S104 determines a retry sending interval based on a reverse exponential backoff algorithm when a heartbeat request response is abnormal, and sending a retry heartbeat request to the server device again after the retry sending interval, until the lease period expires or a corresponding heartbeat request response is normal. Specifically, S104 may determine a backoff sending interval based on an anomaly determining time point of the heartbeat request response and a lease expiration time point using a reverse exponential backoff algorithm, obtain a random time interval correction based on a random-time function and the backoff sending interval, and determine the retry sending interval based on the random correction of the interval and the backoff sending interval.

It should be noted that, a time midpoint of the random time interval correction at S104 is the same as an expiration time point of the backoff sending interval. For example, if the expiration time point of the backoff sending interval is 00:00:32, the time midpoint of the random time interval correction will be 00:00:32, wherein a random correction for time intervals may be several milliseconds, tens of milliseconds, or even longer. Apparently, one skilled in the art should understand that the expiration time point of the backoff sending interval being 00:00:32 at S104 is merely an example, and other existing or future possible specific values of the expiration time point of the backoff sending interval, if applicable to the present disclosure, should also be included in the scope of protection of the present disclosure, and are incorporated herein by reference.

For example, if a heartbeat request response is abnormal and a reverse exponential backoff algorithm is used, a backoff sending interval is determined to be 320 ms based on an anomaly determining time point of the heartbeat request response and a lease expiration time point. If a random time interval correction that is obtained based on a random-time function within the backoff sending interval of 320 ms is 80 ms, because a time midpoint of the random time interval correction the is the same as the expiration time point of the backoff sending interval, a retry sending interval that is determined based on the random time interval correction and the backoff sending interval will be 320 ms±40 ms, that is, a retry heartbeat request is randomly sent to a server device within the retry sending interval 320 ms±40 ms.

In implementations, the lease-based heartbeat protocol method 100 may further include sending a heartbeat request to the server device again after a protocol sending interval (Send Interval) when the heartbeat request response is normal at S106.

For example, if the heartbeat request response is normal, a heartbeat request is sent to the server device again after the protocol Send Interval is lapsed since a receiving time of the heartbeat request response.

In implementations, S106 may further send a heartbeat request to the server device again after a protocol Send Interval when the heartbeat request response is normal. Specifically, S106 may determine a re-initiation time of the heartbeat request according to a receiving time of the heartbeat request response and the protocol Send Interval if the heartbeat request response is normal, and send the heartbeat request to the server device at the re-initiation time.

Figure 4:
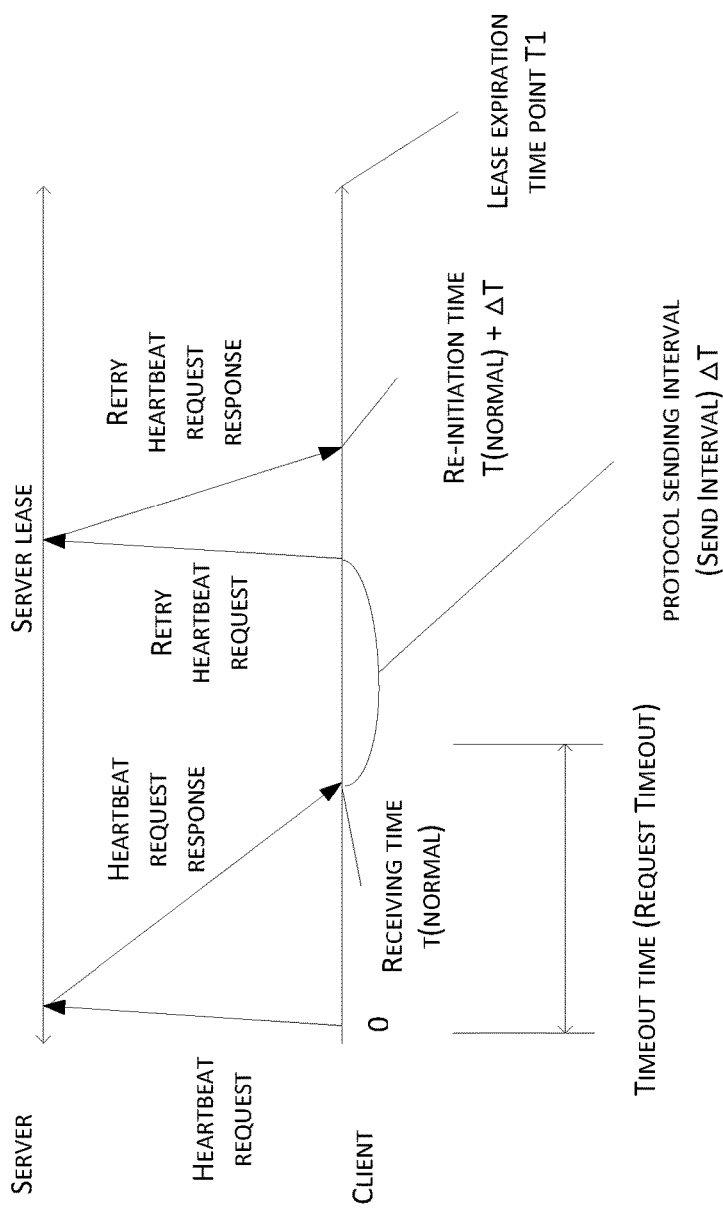
FIG. 4 is a flowchart of a lease-based heartbeat protocol method when a heartbeat request response is normal according to an aspect of the present disclosure.

For example, FIG. 4 shows a flowchart 400 of a lease-based heartbeat protocol method 400 according to an aspect of the present disclosure when a heartbeat request response is normal. In FIG. 4, a client device (client) sends a heartbeat request to a server device (server) and receives a heartbeat request response from the server device. When the heartbeat request response is normal, the client device determines that a re-initiation time for a heartbeat request is t (normal)+ΔT according to a receiving time t(normal) of the heartbeat request response and the protocol Send Interval ΔT, and sends the heartbeat request to the server device at the re-initiation time t(normal)+ΔT. It should be noted that, when the heartbeat request response is normal, random time may also be obtained from the protocol Send Interval based on the receiving time of the heartbeat request response using the random-time function as described in the foregoing embodiment of the present disclosure, thereby determining the re-initiation time of the heartbeat request.

Figure 5:
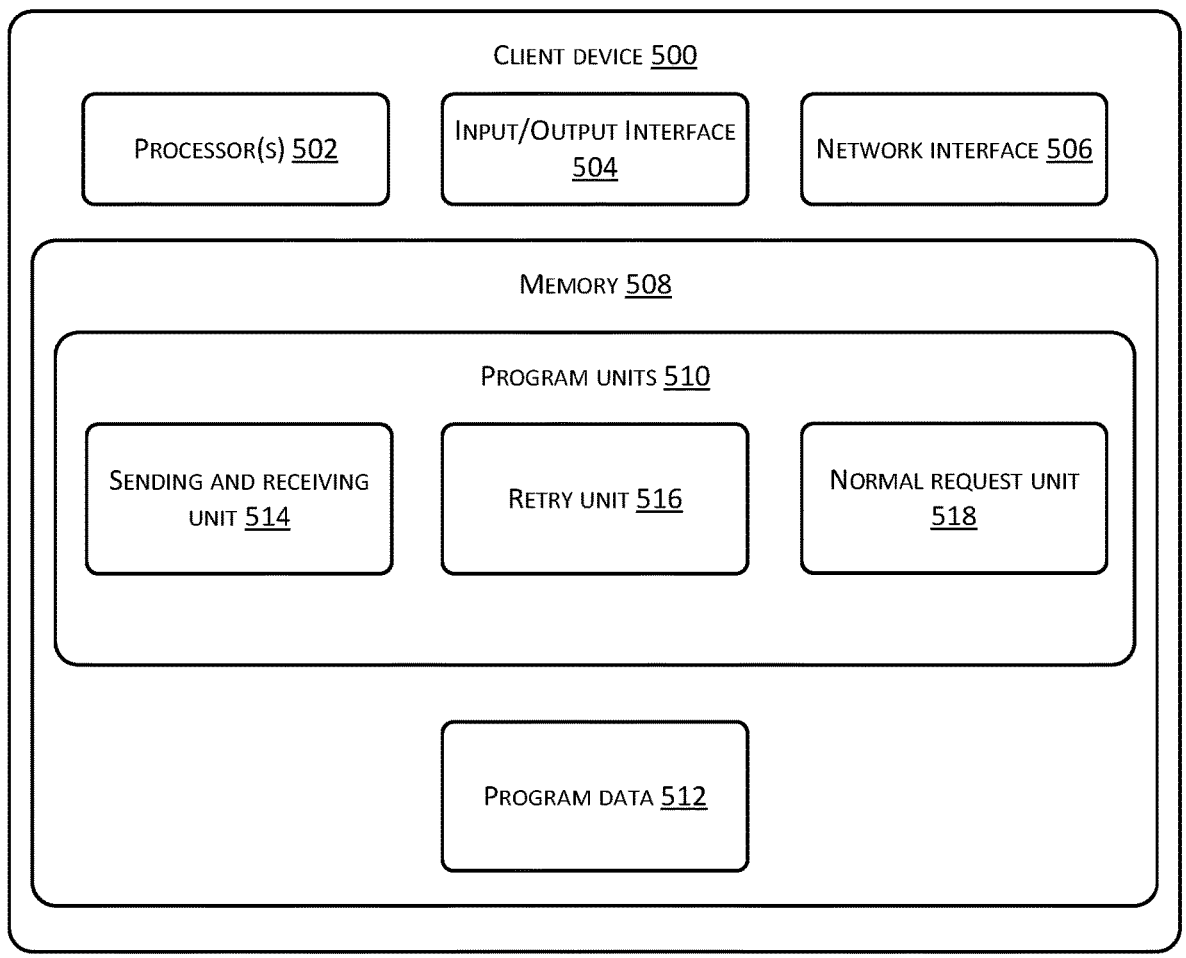
FIG. 5 is a structural diagram of a client device for a lease-based heartbeat protocol according to an aspect of the present disclosure.

FIG. 5 is a structural diagram of a client device 500 for a lease-based heartbeat protocol according to an aspect of the present disclosure. In implementations, the client device 500 may include one or more computing devices. By way of example and not limitation, the client device 500 may include one or more processors 502, an input/output (I/O) interface 504, a network interface 506, and memory 508

The memory 508 may include a form of computer-readable media, e.g., a non-permanent storage device, random-access memory (RAM) and/or a nonvolatile internal storage, such as read-only memory (ROM) or flash RAM. The memory 508 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 508 may include program units S10 and program data 512. The program units S10 may include a sending and receiving unit 514 and a retry unit 516.

In implementations, the sending and receiving unit 514 may send a heartbeat request to a server device within a lease period, and receive a heartbeat request response from the server device. The retry unit 516 may determine a retry sending interval based on a reverse exponential backoff algorithm when the heartbeat request response is abnormal, and send a retry heartbeat request to the server device again after the retry sending interval, until the lease period expires or a corresponding heartbeat request response is normal.

In implementations, the device 500 may include, but is not limited to, a user device, or a device formed from an integration of user device(s) and network device(s) via a network. In implementations, a user device may include, but is not limited to, any type of mobile electronic product. A mobile electronic product may use any operating system, such as an Android operating system, an iOS operating system, etc. In implementations, a network device may include an electronic device that is able to automatically perform numerical computation and information processing according to preset or pre-stored instruction(s), and hardware thereof may include, but is not limited to, a microprocessor, an application specific integrated circuit (ASIC), a field programmable gate array (FPGA), a digital signal processor (DSP), an embedded device, etc. In implementations, a network may include, but is not limited to, the Internet, a wide area network, a metropolitan area network, a local area network, a VPN network, a wireless ad-hoc network (Ad Hoc network), etc. In implementations, the device 500 may also be a script program running on a device that is formed from an integration of user device(s) and network device(s) via a network. Apparently, one skilled in the art should understand that the foregoing device 500 is merely an example, and other existing or future possible devices 500, if applicable to the present disclosure, should also be included in the scope of protection of the present disclosure, and are incorporated herein by reference.

The foregoing units operate continuously among each other. One skilled in the art should understand that the term "continuous" herein means that the foregoing units operate separately in real time or according to requirement(s) of respective preset or real-time adjusted operation modes. For example, the sending and receiving unit 514 may continuously send a heartbeat request to a server device in a lease period, and receive a heartbeat request response from the server device. The retry unit 516 may continuously determine a retry sending interval based on a reverse exponential backoff algorithm in an event that the heartbeat request response is abnormal, and send a retry heartbeat request to the server device again after the retry sending interval, until the lease period expires or a corresponding heartbeat request response is normal.

It should be noted that heart-beating between a client device and a server device in the embodiments of the present disclosure is a periodic process. In a normal situation, a heartbeat period may be divided into three stages. The first stage corresponds to a period from sending of a heartbeat request by the client device to receiving of the heartbeat request by the server device. The second stage corresponds to a period from sending of a heartbeat request response by the server device to receiving of the heartbeat request response by the client device. The third stage corresponds to a period in which the client device waits for a protocol sending interval (Send Interval). These three stages form one heartbeat period that cycles continuously between the client device and server device. In an abnormal situation, the first stage and the second stage may not be successfully completed in one try, and therefore, heartbeat request(s) need(s) to be retried in the lease period. The heartbeat request(s) may be retried multiple times, and the client device may wait for a retry sending interval before each retry. However, the retries of the heartbeat request(s) are not performed for an infinite number of times, and are dependent on the lease period of the client device.

Returning to FIG2, FIG. 2 is a flowchart illustrating distribution of a retry sending interval in a lease-based heartbeat protocol method according to an aspect of the present disclosure. As shown in FIG. 2, the sending and receiving unit 514 of the client device (client) sends a heartbeat request to the server device (server), and receives a heartbeat request response from the server device. In the retry unit 516, when a first heartbeat request response is abnormal and a first retry heartbeat request needs to be sent to the server device, if a first retry sending interval is $T^1$ in FIG. 2, the reverse exponential backoff algorithm is performed on the first retry sending interval $T^1$ when the retry heartbeat request needs to be sent again subsequently, and after it is obtained that the first retry heartbeat request response is abnormal as shown in FIG. 2, a second retry heartbeat request needs to be sent again after a second retry sending interval $T^2$; if subsequent retry heartbeat request responses are abnormal, retry sending intervals obtained based on the reverse exponential backoff algorithm are sequentially $T^3, T^4, T^5 \ldots T^m$, wherein m is the number of times that the retry heartbeat request needs to be sent after a current retry sending interval; the retry heartbeat request is sent to the server device again after the retry sending interval, till the lease expires or the corresponding heartbeat request response is normal.

FIG. 2 is a flowchart illustrating distribution of retry sending intervals in a lease-based heartbeat protocol method according to an aspect of the present disclosure. As shown in FIG. 2, the sending and receiving unit 514 of the client device (client) sends a heartbeat request to a server device (server), and receives a heartbeat request response from the server device. If a first heartbeat request response is abnormal, a first retry heartbeat request needs to be sent to the server device. If a first retry sending interval is $T^1$ as shown in FIG. 2, the retry unit 516 performs a reverse exponential backoff algorithm on the first retry sending interval $T^1$ if the retry heartbeat request needs to be sent again subsequently. Upon determining that the first retry heartbeat request response is abnormal as shown in FIG. 2, a second retry heartbeat request needs to be sent again after the second retry sending interval $T^2$. If subsequent retry heartbeat request responses are abnormal, corresponding retry sending intervals obtained based on the reverse exponential backoff algorithm are $T^3, T^4, T^5 \ldots T^m$ respectively, wherein m is the number of times that the retry heartbeat request needs to be sent after a current retry sending interval. The retry heartbeat request is sent to the server device again after the retry sending interval, until the lease period expires or a corresponding heartbeat request response is normal.

In implementations, when a heartbeat request response is abnormal, the retry unit 516 determines a retry sending interval based on an anomaly determining time point of the heartbeat request response and a lease expiration time point using a reverse exponential backoff algorithm.

In implementations, the retry unit 516 may determine the retry sending interval T based on the anomaly determining time point of the heartbeat request response and the lease expiration time point using $T=(T1-T2)/(K^N)$, wherein T1 is the lease expiration time point, T2 is the anomaly determining time point, K is greater than 1, and N is a current number of retries of sending the heartbeat request.

In implementations, the lease expiration time point T1 of the retry unit 516 may be either a lease of the server device or a lease of the client device, because the lease of the client device is determined by subtracting the anomaly determining time point of the heartbeat request response from the lease of the server device. A value of K, which is used for indicating a reverse backoff degree of the reverse exponential backoff algorithm, is greater than 1. In implementations, K may be equal to 2. Apparently, one skilled in the art can understand that the value of K at S104 is merely an example, and other existing or future possible specific values of K, if applicable to the present disclosure, should also be included in the scope of protection of the present disclosure, and are incorporated herein by reference.

In implementations, the heartbeat request is sent to the server device at a time moment 0, and the lease expiration time point is T1. When the heartbeat request response from the server device is abnormal (with the anomaly determining time point of the heartbeat request response being T2 as shown in FIG. 2), a first retry heartbeat request is sent to the server device after waiting for a first retry sending interval: $T^1=(T1-T2)/(2^1)$ since the anomaly determining time point T2 after the anomaly of the heartbeat request response. If the first retry heartbeat request response is also abnormal (with an anomaly determining time point of the first retry heartbeat request response being t2 as shown in FIG. 2), a second retry heartbeat request is sent to the server device after waiting for a second retry sending interval: $T^2=(T1-T2)/(2^2)$ since the anomaly determining time point t2 after the anomaly of the first retry heartbeat request response. If the second retry heartbeat request response is still abnormal (with an anomaly determining time point of the second retry heartbeat request response being t3 as shown in FIG. 2), a third retry heartbeat request is sent to the server device after waiting for a third retry sending interval: $T^3=(T1-T2)/(2^3)$ since the anomaly determining time point t3 after the anomaly of the second retry heartbeat request response. This pattern repeats accordingly. If an $(N-1)^{th}$ retry heartbeat request response is abnormal at an anomaly determining time point t(N-1) of the $(N-1)^{th}$ retry heartbeat request response, an $N^{th}$ retry heartbeat request is sent to the server device after waiting for an $N^{th}$ retry sending interval: $T^N=(T1-T2)/(2^N)$ obtained through the reverse exponential backoff algorithm, until the lease period expires or a corresponding heartbeat request response is normal.

For example, the heartbeat request is sent to the server device at a time moment 0 and the lease expiration time point T1 is 00:00:52. When the heartbeat request response from the server device is abnormal, with the anomaly determining time point T2 of the heartbeat request response as 00:00:22, a first retry heartbeat request is sent to the server device at a time point 00:00:37 after waiting for a first retry sending interval, which is $T^1=(T1-T2)/(2^1)=15$ seconds, since the anomaly determining time point T2 (which is 00:00:22). If the first retry heartbeat request response from the server device is also abnormal and an anomaly determining time point t2 of the first retry heartbeat request response is 00:00:37.200, a second retry heartbeat request is sent to the server device at the time point 00:00:44.900 after waiting for the second retry sending interval, which is $T^2=(T1-T2)/(2^2)=7.5$ seconds (i.e., 7 seconds and 500 milliseconds) since the anomaly determining time point t2 (which is 00:00:37.400). If the second retry heartbeat request response from the server device is also abnormal and an anomaly determining time point t3 of the second retry heartbeat request response is 00:00:45.100, a third retry heartbeat request is sent to the server device at the time point 00:00:48.850 after waiting for the third retry sending interval, which is $T^3=(T1-T2)/(2^3)=3.75$ seconds (i.e., 3 seconds and 750 milliseconds) since the anomaly determining time point t3 (which is 00:00:45.100), and so forth. If a retry heartbeat request response received from the server device is normal at a certain time point 00:00:32 before the lease expiration time point T1 (which is 00:00:52), this indicates that a heartbeat between the server device and the client device is successfully established in the current lease period. If an $N^{th}$ retry heartbeat request response is still abnormal, and a remaining time between the anomaly determining time point t(N) of the $N^{th}$ retry heartbeat request response and the lease expiration time point T1 (which is 00:00:52) is 150 ms (the remaining time between t(N) and T1 is merely an example here), heart-beating between the server device and the client device is considered to be disrupted at the anomaly determining time point t(N) of the $N^{th}$ retry heartbeat request response because no heartbeat request response from the server device can be received within the 150 ms.

In implementations, the retry unit 516 may determine the anomaly determining time point by determining that the heartbeat request response is abnormal when the heartbeat request response is received and the heartbeat request response includes content indicating that the heartbeat request is an illegitimate request or the heartbeat request response is an error response to the heartbeat request, and determining a receiving time of the heartbeat request response as the anomaly determining time point. In implementations, the retry unit 516 may determine the anomaly determining time point by determining that the heartbeat request response is abnormal when the heartbeat request response is not received before a timeout, and determining a time point of the timeout as the anomaly determining time point.

For example, FIG. 3 shows a flowchart of determining an anomaly determining time point according to an aspect of the present disclosure. As shown in FIG. 3, if a client device (client) receives a heartbeat request response I from a server device (server) after sending a heartbeat request to the server device, the heartbeat request response I is determined as abnormal when content of the heartbeat request corresponding to the heartbeat request response I is illegitimate request content or the heartbeat request response I is an error response to the heartbeat request, and a receiving time t of the heartbeat request response I is determined as the anomaly determining time point T2. If the heartbeat request response from the server device is not received before a timeout (Request Timeout) (e.g., a receiving time of the heartbeat request response II exceeds the timeout), the heartbeat request response II is determined as abnormal, and a time point of the timeout, t(RT), is determined as the anomaly determining time point T2.

In implementations, when the heartbeat request response is abnormal, the retry unit 516 determines a backoff sending interval based on an anomaly determining time point of the heartbeat request response and a lease expiration time point by using a reverse exponential backoff algorithm, obtains a random time interval correction based on a random-time function and the backoff sending interval, and determines a retry sending interval based on the random time interval correction and the backoff sending interval.

It should be noted that, a time midpoint of the random correction of the interval in the retry unit 516 is the same as an expiration time point of the backoff sending interval, for example, if the expiration time point of the backoff sending interval is 00:00:32, the time midpoint of the random correction of the interval is 00:00:32, wherein the random correction of the interval may be several milliseconds, dozens of milliseconds, or even longer. Apparently, one skilled in the art should understand that the expiration time point of the backoff sending interval being 00:00:32 in the retry unit 516 is merely an example of an embodiment of the present disclosure, and other existing or future possible specific values of the expiration time point of the backoff sending interval, if applicable to the present disclosure, should also be included in the protection scope of the present disclosure, and are incorporated herein by reference.

It should be noted that, a time midpoint of the random time interval correction of the retry unit 516 is the same as an expiration time point of the backoff sending interval. For example, if the expiration time point of the backoff sending interval is 00:00:32, the time midpoint of the random time interval correction will be 00:00:32, wherein a random correction for time intervals may be several milliseconds, tens of milliseconds, or even longer. Apparently, one skilled in the art should understand that the expiration time point of the backoff sending interval of the retry unit 516 being 00:00:32 is merely an example, and other existing or future possible specific values of the expiration time point of the backoff sending interval, if applicable to the present disclosure, should also be included in the scope of protection of the present disclosure, and are incorporated herein by reference.

For example, if a heartbeat request response is abnormal and a reverse exponential backoff algorithm is used, a backoff sending interval is determined to be 320 ms based on an anomaly determining time point of the heartbeat request response and a lease expiration time point. If a random time interval correction that is obtained based on a random-time function within the backoff sending interval of 320 ms is 80 ms, because a time midpoint of the random time interval correction the is the same as the expiration time point of the backoff sending interval, a retry sending interval that is determined based on the random time interval correction and the backoff sending interval will be 320 ms±40 ms, that is, a retry heartbeat request is randomly sent to a server device within the retry sending interval 320 ms±40 ms.

Furthermore, the client device 500 may further include a normal request unit 518. The normal request unit 518 sends a heartbeat request to the server device again after a protocol Send Interval when the heartbeat request response is normal.

For example, if the heartbeat request response is normal, a heartbeat request is sent to the server device again after the protocol Send Interval since a receiving time of the heartbeat request response.

In implementations, the normal request unit 518 may further determine a re-initiation time of the heartbeat request according to a receiving time of the heartbeat request response and the protocol Send Interval if the heartbeat request response is normal, and send the heartbeat request to the server device at the re-initiation time.

For example, FIG. 4 shows a flowchart of a lease-based heartbeat protocol method 400 according to an aspect of the present disclosure when a heartbeat request response is normal. In FIG. 4, a client device (client) sends a heartbeat request to a server device (server) and receives a heartbeat request response from the server device. When the heartbeat request response is normal, the client device determines that a re-initiation time for a heartbeat request is t (normal)+ΔT according to a receiving time t(normal) of the heartbeat request response and the protocol Send Interval ΔT, and sends the heartbeat request to the server device at the re-initiation time t(normal)+ΔT. It should be noted that, when the heartbeat request response is normal, random time may also be obtained from the protocol Send Interval based on the receiving time of the heartbeat request response using the random-time function as described in the foregoing embodiment of the present disclosure, thereby determining the re-initiation time of the heartbeat request.

Compared with the existing technologies, the disclosed lease-based heartbeat protocol method and apparatus send a heartbeat request to a server device in a lease period, and receive a heartbeat request response from the server device, determine a retry sending interval based on a reverse exponential backoff algorithm when the heartbeat request response is abnormal, and send a retry heartbeat request to the server device again after the retry sending interval, till the lease period expires or the corresponding heartbeat request response is normal. When the heartbeat request response is abnormal, the retry sending interval is determined based on the reverse exponential backoff algorithm, and the retry heartbeat request is sent to the server device again after the retry sending interval. As such, at an initial stage of heartbeat request retries, two successive retry heartbeat requests can be sent at a relatively large sending interval, thereby reducing impact and pressure of the heartbeat requests on network nodes and the server device. At a later stage of the heartbeat request retries, the sending interval of the heartbeat request retries is reduced, such that re-sent heartbeat requests can be sent at a higher frequency, thereby effectively improving the success rate of recovering from a network failure while ensuring network stability and reducing network pressure.

Furthermore, when a heartbeat request response is abnormal, the disclosed lease-based heartbeat protocol method and apparatus may determine a backoff sending interval based on an anomaly determining time point of the heartbeat request response and a lease expiration time point using a reverse exponential backoff algorithm, obtain a random time interval correction based on a random-time function and the backoff sending interval, and determine the retry sending interval based on the random time interval correction and the backoff sending interval. When a network failure occurs at the server device, the random time interval correction for the backoff sending interval for sending heartbeat requests is obtained based on the random-time function, and the retry sending interval is determined based on the random correction of the interval and the backoff sending interval. Therefore, a resonance effect caused by heartbeat requests simultaneously sent by multiple client devices to the server device is avoided to a certain extent, thus effectively protecting the network nodes and the server device.

It should be noted that the present disclosure may be implemented in software and/or a combination of software and hardware. For example, an application specific integrated circuit (ASIC), a general-purpose computer or any other similar hardware devices may be used for implementing the present disclosure. In implementations, a software program of the present disclosure may be executed by processor(s) to achieve the operations or functions as described in the foregoing description. Similarly, a software program (including a related data structure) of the present disclosure can be stored into a computer readable recording media, for example, a RAM memory, a magnetic or optical drive, a floppy disk, or similar devices. In addition, some operations or functions of the present disclosure may be implemented with hardware, for example, a circuit that performs various operations or functions in cooperation with processor(s).

In addition, a part of the present disclosure may be applied as a computer program product, for example, computer program instruction(s) that, when executed by computing device(s), to invoke or provide the method and/or the technical solution according to the present disclosure through operations of the computing device(s). The program instruction(s) that invoke(s) the method of the present disclosure may be stored in a fixed or removable recording media, and/or transmitted via broadcast or data streams in other signal carrier media, and/or stored in a working memory of a computer device that runs according to the program instruction(s). Implementations of the present disclosure may include herein an apparatus, which includes memory configured to store computer program instruction(s) and processor(s) configured to execute the program instruction(s). When the computer program instruction(s) is/are executed by the processor(s), the apparatus is triggered to run the method and/or the technical solution of the foregoing embodiments of the present disclosure.

For one skilled in the art, it is apparent that the present disclosure is not limited to the details of the foregoing exemplary embodiments, and the present disclosure can be implemented in other specific forms without departing from the spirit or basic features of the present disclosure. Therefore, from whichever point of view, the embodiments should be regarded as exemplary and non-limiting. The scope of the present disclosure is defined by the appended claims instead of the above description. Thus, the present disclosure is intended to cover all changes that are included in the meaning and scope of the equivalent elements of the claims. None of the reference labels in the claims should be regarded as limitations of the claims. In addition, it is apparent that the term "include" does not exclude other units or operations, and a singular form does not exclude a plural form. Multiple units or devices stated in an apparatus claim may also be implemented by a single unit or device through software or hardware. Terms such as "first" and "second" are used to represent names, and do not indicate any specific order.

What is claimed is:

1. A method implemented by a client device, the method comprising:
   sending a heartbeat request to a server device in a lease period, and receiving a heartbeat request response from the server device; and
   determining a retry sending at adaptive interval in response to the heartbeat request response being abnormal, wherein determining the retry sending interval comprises determining a decreasing retry sending interval determined using a reverse exponential backoff algorithm including a difference between an anomaly determining time point of the heartbeat request response and a lease expiration time point, and sending a retry heartbeat request to the server device again after the retry sending interval is past, until the lease period expires or a corresponding heartbeat request response is normal.

2. The method of claim 1, wherein the anomaly determining time point is one of:
   a receiving time of the heartbeat request response in an event that the heartbeat request response comprises content indicating that the heartbeat request is an illegitimate request or the heartbeat request response is an error response to the heartbeat request; or
   a time point of a timeout in an event that no heartbeat request response is received before the timeout.

3. The method of claim 1, wherein the retry sending interval decreases as a number of retries of sending the heartbeat request increases.

4. The method of claim 1, wherein determining the retry sending interval comprises:
   determining a backoff sending interval based at least in part on the reverse exponential backoff algorithm;
   obtaining a random time interval correction based at least in part on a random-time function and the backoff sending interval; and
   determining the retry sending interval based at least in part on the random time interval correction and the backoff sending interval.

5. The method of claim 1, further comprising sending the heartbeat request to the server device again after a protocol sending interval is past if the heartbeat request response is normal.

6. The method of claim 5, wherein sending the heartbeat request to the server device again after the protocol sending interval is past comprises:
   determining a re-initiation time of the heartbeat request according to a receiving time of the heartbeat request response and the protocol sending interval if the heartbeat request response is normal; and
   sending the heartbeat request to the server device at the re-initiation time.

7. A client device comprising:
   one or more processors;
   memory;
   a sending and receiving unit stored in the memory and executable by the one or more processors to send a heartbeat request to a server device in a lease period, and receive a heartbeat request response from the server device; and
   a retry unit stored in the memory and executable by the one or more processors to determine a retry sending at adaptive interval in response to the heartbeat request response being abnormal, and send a retry heartbeat request to the server device again after the retry sending interval is past, the retry sending interval decreasing exponentially as a number of retries of sending the heartbeat request increases, according to a reverse exponential backoff algorithm that depends in part on a difference between an anomaly determining time point of the heartbeat request response and a lease expiration time point.

8. The client device of claim 7, wherein the anomaly determining time point is one of:
   a receiving time of the heartbeat request response in an event that the heartbeat request response comprises content indicating that the heartbeat request is an illegitimate request or the heartbeat request response is an error response to the heartbeat request; or
   a time point of a timeout in an event that no heartbeat request response is received before the timeout.

9. The client device of claim 8, wherein the retry unit resends the heartbeat request to the server device until the lease period expires or a normal heartbeat request response is received.

10. The client device of claim 7, wherein the retry unit is further configured to:
   determine a backoff sending interval based at least in part on the reverse exponential backoff algorithm;
   obtain a random time interval correction based at least in part on a random-time function and the backoff sending interval; and
   determine the retry sending interval based at least in part on the random time interval correction and the backoff sending interval.

11. The client device of claim 7, further comprising a normal request unit to send the heartbeat request to the server device again after a protocol sending interval is past in an event that the heartbeat request response is normal.

12. The client device of claim 11, wherein the normal request unit is further configured to:
   determine a re-initiation time of the heartbeat request according to a receiving time of the heartbeat request response and the protocol sending interval if the heartbeat request response is normal; and
   send the heartbeat request to the server device at the re-initiation time.

13. One or more computer-readable media storing executable instructions that, when executed by one or more processors of a client device, cause the one or more processors to perform acts comprising:
   sending a heartbeat request to a server device in a lease period, and receiving a heartbeat request response from the server device; and
   determining a retry sending at adaptive interval in response to the heartbeat request response being abnormal, wherein determining the retry sending interval comprises determining a decreasing retry sending interval determined using a reverse exponential backoff algorithm including a difference between an anomaly determining time point of the heartbeat request response and a lease expiration time point, and sending a retry heartbeat request to the server device again after the retry sending interval is past, until the lease period expires or a corresponding heartbeat request response is normal.

14. The one or more computer-readable media of claim 13, wherein the anomaly determining time point is one of:
   a receiving time of the heartbeat request response in an event that the heartbeat request response comprises content indicating that the heartbeat request is an illegitimate request or the heartbeat request response is an error response to the heartbeat request; or
   a time point of a timeout in an event that no heartbeat request response is received before the timeout.

15. The one or more computer-readable media of claim 13, wherein the retry sending interval decreases as a number of retries of sending the heartbeat request increases.

16. The one or more computer-readable media of claim 13, wherein determining the retry sending interval comprises:
   determining a backoff sending at adaptive interval based at least in part on the reverse exponential backoff algorithm;
   obtaining a random time interval correction based at least in part on a random-time function and the backoff sending interval; and
   determining the retry sending interval based at least in part on the random time interval correction and the backoff sending interval.

17. The one or more computer-readable media of claim 13, the acts further comprising sending the heartbeat request to the server device again after a protocol sending interval is past if the heartbeat request response is normal.

* * * * *